Nov. 4, 1930.   H. T. MELLING   1,780,562
VALVE
Filed June 11, 1927   2 Sheets-Sheet 1

INVENTOR
Herbert Tom Melling,
BY
Frederick Breitenfeld
ATTORNEY

Nov. 4, 1930.  H. T. MELLING  1,780,562
VALVE
Filed June 11, 1927   2 Sheets-Sheet 2

INVENTOR
*Herbert Tom Melling,*
BY
*Frederick Breitenfeld*
ATTORNEY

Patented Nov. 4, 1930

1,780,562

UNITED STATES PATENT OFFICE

HERBERT TOM MELLING, OF NEW YORK, N. Y.

VALVE

Application filed June 11, 1927. Serial No. 198,030.

My present invention relates generally to valves, and has particular reference to valves which are primarily designed for use in transport systems for pulverized solid material.

Pulverized coal or similar solid material such as flour and the like, is generally transported through pipe systems by means of suspension thereof in compressed air. Valves for employment in such systems must be of a character which are easily operable despite the pressure therein. Such valves must also be designed to close securely, for even a slight leakage of the suspended solid material through an ostensibly shut-off opening will render it dangerous if not impossible for men to work in a chamber, such as a hopper or the like, which is presumably shut-off.

It is one object of the present invention to provide a valve having these desirable characteristics. It is another object to provide such a valve with lubricating means and with a structure which permits the lubrication of the valve parts to be effected despite the difficulties presented by the constant presence of the dry suspended solid material.

In valves which are constructed with a pivotal support whose pivoting moves a valve in a slidable manner along the internal wall of the valve body, the closure is hardly ever firmly assured for the reasons that (a) lubrication of the sliding surfaces is impracticable because of the material being conveyed; (b) firm mutual seating between two extensive surfaces is hardly ever possible; and (c) the pulverized material constantly finds its way between the sliding surfaces and thereby impairs not only easy sliding but also firm contact. It is an object of the present invention to provide a valve wherein closure is effected in a firm and secure manner despite the presence of solid material, and wherein the problem of lubrication presented by the disadvantageous structure mentioned above has been obviated.

One feature of my invention resides in the provision of a valve wherein the valve proper is brought into closing or opening relationship with respect to a selected opening by movements toward and away from said opening as distinguished from sliding movements with respect thereto.

Other features of my invention lie in the structural nature which renders the operation of the valve quick and easy yet highly efficient, and which does not entail an unreasonable cost of manufacture.

For the attainment of the foregoing objects and such other objects as may hereinafter appear or be pointed out, I have illustrated two embodiments of my invention in the accompanying drawings, in which—

Figure 1:
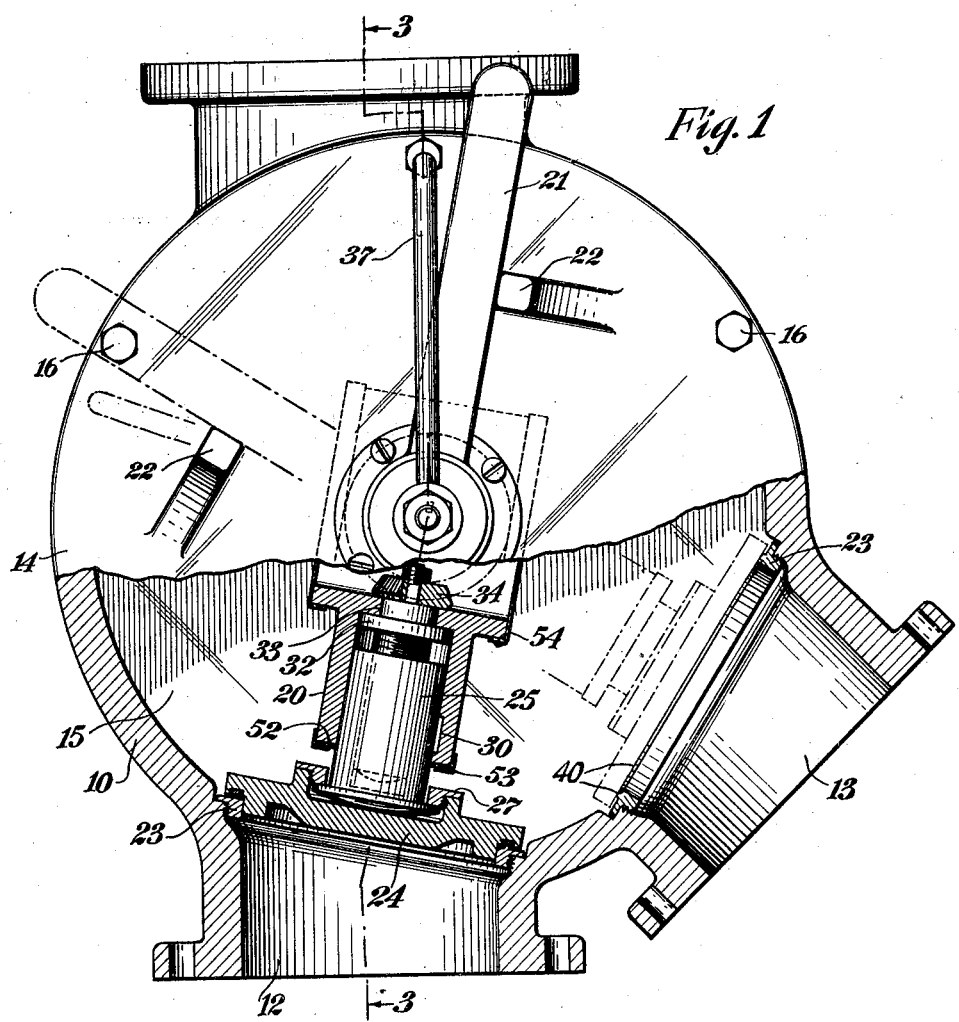
Fig. 1 is a side view of a valve constructed in accordance with the present invention, a portion of the outer wall being broken away to reveal the interior, and a portion of the interior being shown in cross-section. This figure also shows in dot and dash lines an alternative positioning of the valve proper.

The valves to which my invention relates are generally of substantially cylindrical construction, the valve body comprising a casting 10 provided with the desired number of outlet or inlet openings. I have illustratively shown a structure wherein an opening 11 may be considered as the inlet opening, and wherein openings 12 and 13 may be considered alternate outlet openings. The valve shown would therefore be positioned in a pipe line feeding into the opening 11, and the function of the valve would be to close one or the other of the outlet openings 12 and 13. In accordance with usual design and requirements, I have shown the axes of the openings 12 and 13 arranged at an angle of 45° to each other.

The ends of the casting 10 are ultimately closed by end plates 14 and 15 fastened thereto by studs 16 or the like. Journaled between the end plates 14 and 15 is a pivotal valve guide consisting essentially of an integral structure which embodies a trunnion 16' journaled in the wall 15, a trunnion 17 journaled in the wall 14, and a trunnion extension 18 passing outwardly through the wall 14. This integral structure is in effect a spindle extending along the axis of the cylindrical wall in which the openings 11, 12, and 13 are arranged. The medial portion of the valve guide is shaped to define a chamber 19 for housing certain valve-controlling mechanism. The chamber 19 may be considered as the rear portion of a radial sleeve 20 designed to accommodate the valve stem of the valve proper.

Before describing the valve in further detail, I will point out that the valve guide is designed to be pivoted or rotated for pivoting the valve proper between desired positions. I have shown a handle 21 suitably attached to the exterior end of the extension 18, and I have shown stops 22 integrally formed upon the wall 14 for limiting the movement of the control handle 21. It will be understood that the provision of such stops is optional, and that the particular degree of rotation of the handle 21 may be varied to suit the requirements of particular valves. It will also be understood that the valve guide may be rotated or pivoted by other than manual means, as for example by a motor.

In each of the openings 12 and 13, whose opening and closing is controlled by the valve, I provide a valve seat 23. The valve proper consists essentially of a forward disc 24 for resting upon a selected valve seat, and a valve stem 25 extending rearwardly into the sleeve 20. An essential feature of my invention lies in mounting the valve in the valve guide in a movable manner, and more particularly in a reciprocable manner, so that the valve may be raised or lowered with respect to a selected valve seat; and in providing means for exteriorly controlling this movement or reciprocation of the valve. Although the particular method of mounting the valve in this reciprocable manner is in many respects a matter of choice, and although the particular mechanism for causing the movement of such a valve is also in many respects a matter of choice, nevertheless the structure which I have illustrated and which I shall now describe has been found to be extremely satisfactory and to achieve the contemplated purposes in a simple and efficient manner.

Figure 2:
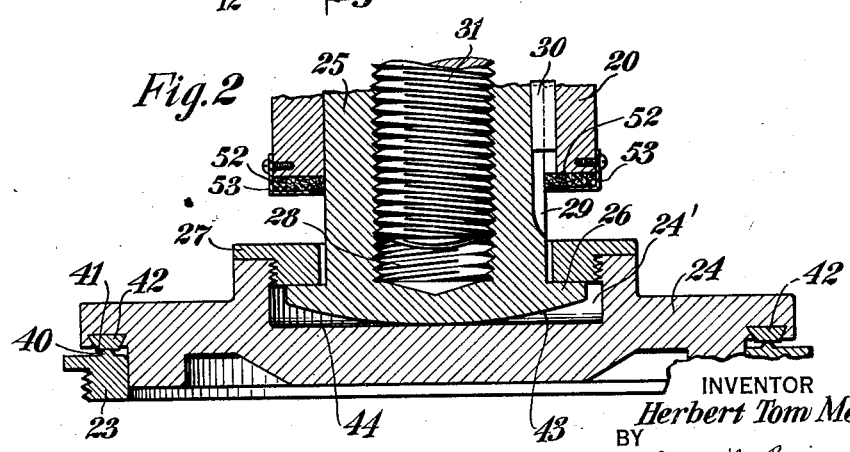
Fig. 2 is an enlarged cross-sectional view of a portion of the interior mechanism disclosed in Figure 1.

Referring particularly to Fig. 2, I have shown the valve disc 24 provided with a central rear recess 24' for the accommodation of the forward enlarged end 26 of the valve stem. In other words, the valve stem of the present structure is a separate element. A suitable nut or ferrule 27 is designed to engage the outer end of the recess 24' and to hold the enlarged end 26, and consequently the valve stem itself, in position.

Figure 3:
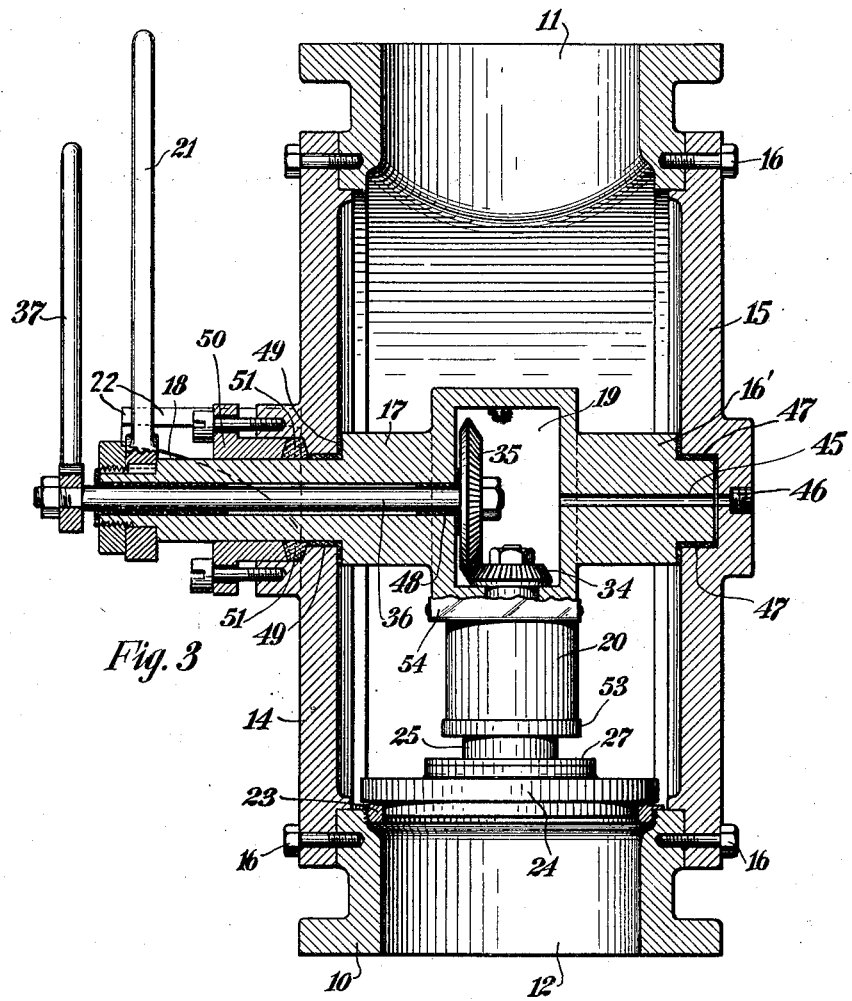
Fig. 3 is a cross-sectional view taken substantially along the line 3—3 of Fig. 1.

In the embodiment illustrated in Figures 1, 2, and 3, the valve stem 25 is provided with an internally threaded axial bore 28 extending from the rear end thereof to a point short of the forward end thereof. The valve stem is splined in the sleeve 20 to permit reciprocating movement thereof and to prevent rotation thereof. For this purpose I have provided the stem with a longitudinal key-way 29 adapted to register with a similar key-way in the interior of the sleeve 20 and to receive a key 30 therein.

Rotatably mounted in the sleeve 20 is a threaded member designed to engage the threads of the valve stem 25 and to reciprocate the valve within the sleeve when rotation is effected. In the form illustrated in Figures 1-3, I have shown this threaded member in the form of an externally threaded rod or bolt 31. This member is mounted so as to prevent longitudinal movement thereof, and for this purpose I have provided it with a collar 32, a reduced portion 33 directly to the rear of the collar 32, and a gear 34 acting as a second collar directly to the rear of the reduced portion 33.

Referring to Figure 3, it will be seen that the gear 34 is a beveled gear and is positioned within the chamber 19. Meshing therewith is a relatively larger beveled gear 35 mounted upon the interior end of a control shaft 36 which extends outwardly through an axial bore in the trunnion extension 18. At the exterior end of the control shaft 36 I have provided a control lever 37 whose manipulation will rotate the gear 35 and hence the rotatable member 31.

Figure 4:
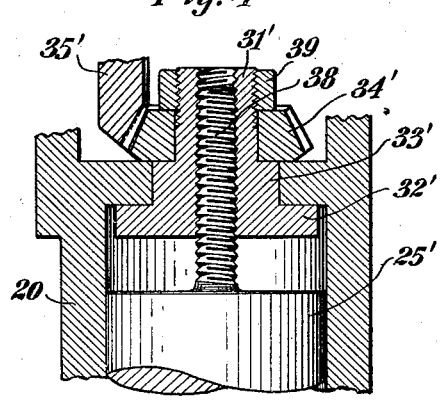
Fig. 4 is an enlarged fragmentary cross-sectional view of a modification.

In Figure 4 I have illustrated a modification wherein the valve stem 25' is not interiorly threaded as in the previous construction but is provided with an exteriorly threaded extension 38. This extension is engaged by a threaded member 31' which is interiorly threaded as distinguished from the exterior threading of the member 31. In this modification, the member 31' is also provided with a collar 32', a reduced adjacent portion 33', and a gear 34' fulfilling the purpose of a second collar. Figure 4 illustrates one way of attaching the gear to the rotatable member, i. e., by means of a nut 39 engaging the exterior of the upper end of the rotatable threaded member 31 or 31'. In the modification of Figure 4, it will be obvious that the rotation of the gear 35' will cause rotation but not longitudinal movement of the rotatable member 31'.

Referring again to Figure 2, and particularly to the valve seat 23, it will be noted that I have shown the valve seat provided with an annular rib 40 having a convexly curved outer surface. This rib is in the path of a flat annular seating surface 41 provided upon the valve disc 24. I have illustratively shown the flat seating surface 41 provided upon an insert 42 constructed of suitable material.

In Figure 2 it will also be noted that the forward face 43 of the valve stem is convexly curved and contacts at its center with the bottom surface 44 of the recess 24'. The provision of this covexly curved surface is related to the separable provision of the valve stem, and this construction permits the valve disc 24 to adjust itself securely upon the valve seat 23 when an axial longitudinal pressure is exerted upon it upon rotation of the member 31.

Before describing the details of the lubricating means and features, I will briefly describe the general operation of the valve.

When the valve is in the position of Figure 1, a clear unrestricted passage for the pulverized material is provided from the inlet opening 11 through the valve and through the outlet opening 13. The only impedance to this free passage is the valve guide or trunnion construction which extends between the opposite walls 14 and 15, but this structure is practically no larger than any ordinary trunnion would be for pivoting a valve proper within the valve body. When it is desired to open the outlet opening 12 and close the opening 13, the control lever 37 is first rotated for the purpose of raising the valve from its seat. The rotation of the lever 37 is transmitted through the control shaft 36 to the gear 35, thence to the gear 34 and the rotatable member 31. The rotation of the member 31 causes the valve stem 25 to retract into the sleeve 20, and thereby the valve disc 24 is raised from the seat 23. The valve is raised only a slight amount sufficient to permit its subsequent pivotal movement within the valve body, and where the gears and threads are properly designed the control lever 37 need only be moved through a relatively small arc.

The valve having been raised from its seat, the control lever 21 is thrown from the position shown in Figure 1 to the dotted line position of Figure 1. This movement is transmitted through the trunnion extension 18 to the valve guide structure within the valve body, and the entire chamber 19, sleeve 20, and accordingly the valve stem and valve itself, are swung through an arc into operative relationship with respect to the opening 13. Thereupon, the control lever 37 is again operated to expel the valve stem 25 from the sleeve 20 and thereby position the valve into a seating relationship with respect to the valve seat 23 in the opening 13. At this time, the convexity of the surface 43 will permit the valve to adjust itself securely and properly upon the valve seat 23.

This entire manipulation may be effected with great ease despite the existence within the valve body of a considerable pressure. It will be noted that no sliding movement is relied upon to seat the valve, and accordingly no problems of friction or faulty seating are presented. Furthermore, the provision of the rib 40, which establishes a line contact between the valve seat and the valve seating surface, assures a tight closure without any possibility of dry pulverized solid material interfering with the proper seating.

For the purpose of effecting a proper lubrication of the internal parts, and particularly the valve stem; and for the added purpose of protecting this lubricating material from the pulverized material existing in the valve body, I have provided packing means and lubricating means which I shall now describe.

The trunnion 16' is provided with a bore 45 which extends from the end of the trunnion into the chamber 19. This bore registers with a small opening 46 in the wall 15. The opening 46 may normally be sealed or closed by a suitable plug, and when it is desired to force grease or other lubricating material into the interior of the chamber 19, the plug is removed and the bore 45 affords a suitable passage. A suitable lining 47 is provided in association with the trunnion 16' so that no lubricating material may find its way through the bearing into the valve body, and similarly, no material from the valve body can find its way into the passage 45.

Packing and bushings are also provided wherever necessary, as at the points 48, behind the gear 35, and at the points 49, between the trunnion 17 and the wall 14. A gland 50, together with suitable packing 51, is arranged around the trunnion extension 18 as it passes through the wall 14.

The lubricating material forced into the chamber 19 will work its way downwardly into the sleeve 20, and the only point requiring protection is that at which the valve stem 25 projects from the sleeve 20. At this point I prefer to provide a felt washer 52 or the like upon the end of the sleeve 20, and to hold this washer in place a suitable cap 53 is attached to the sleeve 20. The opposite open ends of the chamber 19 are suitably sealed and closed after the interior elements have been assembled, by means of plates or walls 54 and whatever lining or packing may be deemed desirable.

It will be obvious that the particular arrangement of openings in the valve body is independent of the essential nature of my invention. For example, a valve seat 23 might be arranged in the opening 11, and the stops 22 may be so positioned that the opening 11 may itself be closed whenever it is desired to shut the opening 11 itself. Furthermore, it will be understood that the reciprocating movement of the valve may be effected by other means, as for example by means of a piston and cylinder. Thus, the chamber 19 and the sleeve 20 might be constructed to constitute a cylinder, a suitable piston might be mounted therein in connection with the valve stem 25, and by means of ports or passages through the trunnion extension 18, the piston might be operated from the exterior of the device to actuate the valve. Similarly, a spring might be so arranged with respect to the valve stem or valve as to hold the latter in a normal position, and the movement of an exterior control lever might be made to actuate a cam or the like for forcing the valve stem or valve in a longitudinal direction against the normal action of the spring. Or, in place of the gears 34 and 35, a pinion and rack might be provided for achieving the same purpose.

In general, it will be obvious that many changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, a valve reciprocally mounted in said guide and including a valve stem extending into said sleeve, means for pivoting said guide to position the valve into operative relationship with a selected opening, and means for reciprocating said valve to raise and lower it with respect to the valve seat in said opening.

2. In a transport valve for pulverizing material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, a valve reciprocally mounted in said guide and including a valve stem extending into said sleeve, means for pivoting said guide to position the valve into operative relationship with a selected opening, and means for reciprocating said valve to raise and lower it with respect to the valve seat in said opening, said last named means including mechanism arranged in said sleeve and engaging said valve stem.

3. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, a valve reciprocally mounted in said guide and including a threaded valve stem extending into said sleeve, means for pivoting said guide to position the valve into operative relationship with a selected opening, and means for reciprocating said valve to raise and lower it with respect to the valve seat in said opening, said last named means including a threaded member in said sleeve and engaging said threaded valve stem.

4. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, a valve reciprocally mounted in said guide and including a threaded valve stem splined in said sleeve, means for pivoting said guide to position the valve into operative relationship with a selected opening, and means for reciprocating said valve to raise and lower it with respect to the valve seat in said opening, said last named means including a rotatable threaded member in said sleeve and engaging said threaded valve stem.

5. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, a valve reciprocally mounted in said guide and including a valve stem extending into said sleeve, means for pivoting said guide to position the valve into operative relationship with a selected opening, and means for reciprocating said valve to raise and lower it with respect to the valve seat in said opening, said last named means including mechanism arranged in said sleeve and engaging said valve stem, and a control shaft extending from the interior of said sleeve to the exterior of the valve body for externally controlling the operation of said mechanism.

6. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, a valve reciprocally mounted in said guide and including a valve stem extending into said sleeve, means for pivoting said guide to position the valve into operative relationship with a selected opening, mechanism in said sleeve and engaging said valve stem for reciprocating the valve to raise and lower it with respect to the valve seat in said opening, and means for supplying lubricating material from the exterior of the body to the interior of said sleeve.

7. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, said trunnion having a bore communicating from the end of the trunnion to the interior of the sleeve, a valve reciprocally mounted in said guide and including a valve stem extending into said sleeve, means for pivoting said guide to position the valve into operative relationship with a selected opening, means movable with the trunnion for reciprocating said valve, and means for packing said trunnion end and said sleeve so that lubricating material fed into the sleeve through said bore will be protected from the material passing through the valve.

8. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion carrying a radial sleeve, said trunnion having an axially bored extension passing out of the valve body, a valve reciprocally mounted in said guide and including a valve stem extending into said sleeve, means for rotating said trunnion extension to pivot the valve guide and position the valve into operative relationship with a selected opening, mechanism in said sleeve and engaging said valve stem for reciprocating the valve, and means for controlling the operation of said mechanism from the exterior of the valve body, said last named means comprising a control shaft extending through said trunnion extension into said sleeve.

9. In a transport valve for pulverized material, the combination with a valve body which includes a substantially cylindrical wall having an inlet and at least two outlet openings therein, of a valve seat arranged in each opening, a pivotable valve guide in said body and wholly clear of said wall and including a trunnion having an axially bored extension passing out of the valve body, a valve movably mounted in said guide, means for rotating said trunnion extension to pivot the valve guide and position the valve into operative relationship with a selected opening, and means for exteriorly controlling the movement of said valve in said guide, said last named means including a control shaft extending out of the valve body through said trunnion extension.

10. A transport valve for pulverized solid material comprising a valve body, a valve carrier rotatably mounted therein and clear of all walls of the body which do not cross the axis of rotation, a valve guide mounted on said carrier and clear of all walls of the valve body, a valve mounted in said guide for radially reciprocal movement with respect to said axis, means for rotating said carrier, means for reciprocating said valve, and means for supplying lubricating material from the exterior of the body to the interior of said guide.

11. In a transport valve for pulverized material, a valve body which includes a substantially cylindrical wall having inlet and outlet openings therein, a valve including a valve stem within the body and reciprocable outwards and inwards with respect to said wall, an adjustable valve carrier clear of said wall and supporting said valve and including a radial sleeve enclosing said valve stem, means exterior of the valve body for adjusting said carrier so as to position the valve into or out of operative relationship with respect to a selected opening, whereby adjustment of said carrier may be effected without any frictional contact between it or the valve and said wall, and means for supplying lubricating material from the exterior of the valve body to the interior of said sleeve.

In witness whereof, I have signed this specification this 9th day of June, 1927.

HERBERT TOM MELLING.